Oct. 1, 1957 B. S. VILKOMERSON 2,808,454

WAVE GENERATING CIRCUITS

Filed July 31, 1952

INVENTOR.

Benjamin S. Vilkomerson

BY [signature]

ATTORNEY

United States Patent Office 2,808,454

Patented Oct. 1, 1957

2,808,454

WAVE GENERATING CIRCUITS

Benjamin S. Vilkomerson, Camden, N. J., assignor to Radio Corporation of America, a corporation of Delaware Application July 31, 1952, Serial No. 301,896

7 Claims. (Cl. 178—5.4)

The present invention relates to electric wave generating circuits and means for stabilizing and controlling the frequency and phase thereof.

In more particularity, although not necessarily exclusively, the present invention relates to improvements in synchronizing and controlling the frequency and phase of cathode ray beam deflection circuits of the type frequently employed in television receiving systems.

One of the most important factors involved in the successful reproduction of high definition television images is that of frequency and phase control of the wave form generating circuits which produce the deflection wave forms for the cathode ray beam image reproducing device.

There are many places in the communications art where a fixed but non-integral frequency relation must be maintained between two oscillators or wave form generating circuits. Perhaps one of the more prominent occasions for such an arrangement is found in the television deflection circuits of a present day television receiving system.

For example, in the reproduction of present day 525 line 30 frame television images, it is the practice to provide special deflection circuits for the vertical and horizontal scanning functions of the television receiver. The television circuits are generally of the self-sustaining variety so that each functions regardless of the presence or absence of synchronizing signal information derived from a received television signal. However, when being synchronized by a received signal, there exists and must be maintained a discrete frequency ratio between the horizontal and vertical deflection oscillators in order to obtain the highest definition television images. This is particularly so because of the feature, upon which present RMA television standards are based, of line interlace. Line interlace requires that the frequency relation between horizontal and vertical deflection wave form generators be fractional. Thus it is that one complete television frame based on present RMA standards comprises two television fields, each field having in it 262.5 lines. Successive fields are displaced vertically by one line so that a complete matrix or raster of 525 equally spaced television lines will be described every $\frac{1}{30}$ of a second.

It is clear, therefore, that should the vertical deflection oscillator fail to maintain an exact frequency value of 1/262.5 of the horizontal deflection rate of 15,750, the successive fields will not fall midway between the lines of its preceding field nor will the lines of one field be horizontally aligned with those of a previous field. This deleterious effect is known as "lack of interlace" or "pairing" and causes the definition of the television image to suffer greatly. Objects appear fuzzy and indistinct even when the fidelity of the television video signal is very high.

The present invention provides novel means for maintaining an exact frequency relation between two oscillators operating at different frequencies and hence provides means for enhancing the precision of line interlace in television receiving systems. In its broadest form the present invention contemplates the introduction into the vertical deflection circuit of a control signal wave form harmonically related to the horizontal deflection circuit operating frequency.

In one form the present invention contemplates the provision of a special but inexpensive transformer for use in a vertical deflection wave form generating circuit. The transformer is constructed so as to display a novel parasitic ringing at any multiple of the second harmonic of the horizontal deflection frequency. The parasitic wave form acts as a synchronizing or interlacing control wave form so as to discriminate against the synchronization of the vertical oscillator at times other than a time which will produce perfect interlace of two successive television fields.

According to the present invention the precision of interlacing obtainable is so inherently high through the use of the novel interlace control signal that the prior art use of rather high amplitude vertical deflection synchronizing signals is no longer necessary. The present invention permits precision synchronization of the vertical deflection oscillator with a minimum of synchronizing signal amplitude.

Furthermore, the utilization of the above mentioned novel control signal, in urging precision synchronization of the vertical oscillator at a predetermined instant in time discriminates against the effect of noise received by the television receiver during intervals between the desired synchronized instants. Missynchronization produced by stray coupling of horizontal rate deflection signals into the vertical deflection circuits is also minimized by the present invention.

Moreover, whereas in the prior art rather expensive blocking oscillator transformers were frequently employed to achieve a relatively satisfactory degree of vertical synchronizing stability, the utilization of a synchronizing control signal as embraced by the present invention reduces greatly the need for high quality components in television receiving systems.

Although the discussion and description of the present invention hereinafter is more or less concerned with specific applications in the television art, it is to be understood from what has been stated that the utility of the novel synchronizing system of the present invention is in no way limited to television deflection oscillators, television receiving systems, or television systems in general. On the contrary, the present invention finds ready application to many arrangements in the communications and electronics arts, wherein a fixed frequency difference and timing relationship must be maintained between two wave generating circuits of different operating frequencies.

It is, therefore, seen that one object of the present invention is to provide an improved oscillator timing controlling system which has a marked degree of immunity against spurious synchronizing and control signals.

It is further a purpose of the present invention to provide an improved synchronizing system for control of electrical wave generators.

It is still further an object of the present invention to provide an improved deflection synchronizing system for television receivers.

Another object of the present invention resides in a novel system for improving the line interlacing in television receivers.

Still another object of the present invention is to improve the picture quality provided by television receivers while reducing the cost of manufacture of such receivers.

A still further object of the present invention resides in a provision of a simplified deflection oscillator circuit for use in the vertical deflection circuits of a television receiver of such a nature as to require an extremely simplified and inexpensive type of deflection oscillator transformer.

It is, moreover, an object of the present invention to provide a simple and inexpensive deflection oscillator transformer especially suited for use in vertical deflection circuits of television receivers.

Other objects and features of advantage embraced by the present invention, as well as a more complete understanding of its novel features and operating principles will be gleaned from a reading of the following description, especially when taken in connection with: the accompanying drawings in which Fig. 1 is a combination block diagram and schematic representation of one form of the present invention as applied to television receivers;

Figure 1:
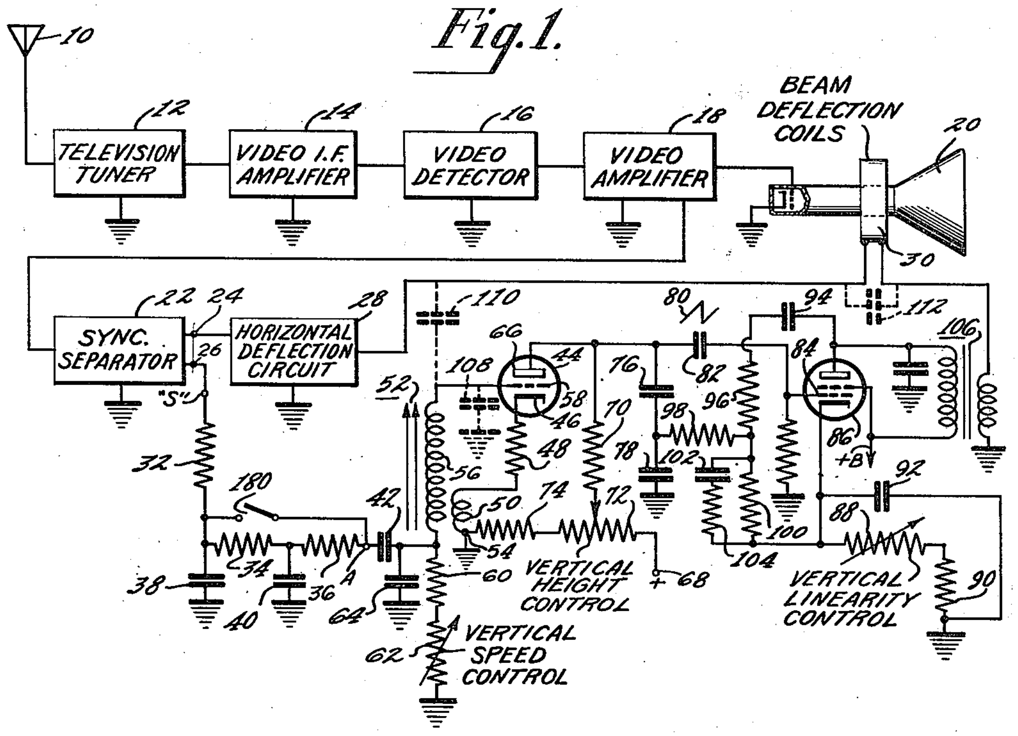

Turning now to the drawings in detail, there is shown in Fig. 1 a television receiving antenna 10, adapted to receive and feed a television signal into a television tuner 12. The output of tuner 12 is connected to a video intermediate frequency amplifier 14, whose output in turn is adapted to feed a video detector 16. The demodulated video signal which will appear at the output of the video detector 16 is then fed to a video amplifier 18, and thence to an image reproducing device such as the kinescope 20.

By way of example, the video signal has been shown as applied to the control electrode of the kinescope 20, however, other means of feeding the kinescope 20 are well known.

At some point in the video amplifier 18 video signals are extracted and applied to a synch separator circuit 22 or equivalent, which at least partially separates the horizontal and vertical synchronizing signal from the video signal and channels them to respective output terminals 24 and 26.

Horizontal deflection signals are applied from terminal 24 to a horizontal deflection circuit 28 whose output is connected to the horizontal deflection coil section of the beam deflection coil 30. Suitable circuitry for inclusion in the block elements shown and discussed above, as well as throughout this entire specification are well known in the art and are to be found in the literature, for example in the "Radio Electronics Magazine" for November 1950, pages 34 and 36 under the title of "Radio set and service review" and also in the "RCA Review" for March 1947, on pages 5 through 28 thereof.

According to the embodiment of the present invention shown in Fig. 1, the vertical synchronizing signals appearing at terminal 26 of the synch separator 22 is applied to an integrating network comprising resistances 32, 34 and 36, and capacitors 38 and 40. As in prior art arrangements, the integrating network tends to integrate out rapid voltage fluctuations such as result from noise and the like. The integrated vertical synchronizing signal is then respectively coupled by a capacitor 42 to the grid circuit of an oscillator, involving an amplifying device such as vacuum tube 44.

Vacuum tube 44 has its cathode 46 connected through a biasing resistor 48 and through the primary winding 50 of oscillator transformer 52 to a datum or ground potential having terminal at 54. The secondary winding 56 of the oscillator transformer 52 is connected with the control electrode 58 of the vacuum tube 44 and the ground return resistances 60 and 62 for the control electrode 58. In shunt with the resistances 60 and 62 is positioned a capacitor 64, the value of which taken in combination with the total series value of resistances 60 and 62 determine in part the free running operating frequency of the oscillator. Power supply for the anode 66 of the amplifier 44 is obtained from the positive power supply terminal 68 through resistance 70 and a portion of the potentiometer 72.

A resistance 74 is connected with the other extremity of the potentiometer 72 so as to form a voltage divider across the positive supply power terminal 68, thereby to allow the potentiometer 72 to act as a speed control for the vertical deflection circuit. Sawtooth charging capacitors 76 and 78 are connected from the anode 66 to ground so as to linearly charge during periods of non-conduction of tube 44 and to rapidly discharge during periods of conduction of tube 44. This charging and discharging provides a sawtooth wave form such as shown at 80. The sawtooth wave form 80 is then capacitively coupled by condenser 82 to a control electrode 84 of a vertical output amplifier 86. The vertical deflection output stage in which the amplifier 86 is involved is in itself quite conventional and is no part of the present invention.

The resistances 88 and 90 in the cathode circuit of the amplifier 86 are by-passed by the capacitor 92. Variable resistance 88 acts as a linearity control by controlling the operating conditions of the amplifier tube 86. Feedback capacitor 94 in conjunction with the network 96, 98, 100, 102 and 104 provide a further linearizing feedback action which forms no part of the present invention. The developed deflection signal is conveyed via output transformer 106 to the vertical deflection section of the beam deflection coil 30. In the practice of the present invention, the oscillator transformer 52 is constructed such that it is resonant at some integral multiple, preferably even multiple, of the second harmonic of the horizontal deflection frequency. The inductance of the secondary 56, taken in conjunction with the stray circuit capacitances 108, 110, and 112 may be designed to produce this resonance. Under such conditions, stray circuit capacitances such as 110 and 112 will generally produce sufficient coupling to the oscillator transformer secondary 56 to maintain an oscillation or ringing in the transformer secondary 56 at this parasitic resonance. Should stray capacitances be insufficient for either tuning secondary 56 of the oscillator transformer or coupling sufficient horizontal energy to the transformer, stray capacitance may be supplemented by physical capacitors of suitable size.

The effect of the parasitic ringing of the oscillator transformer is evidenced by the several wave forms illustrated in Figs. 2*a*, 2*b* and 2*c*. To one skilled in the art, the wave form 114 shown in Fig. 2*a* will be recognized as a typical blocking oscillator wave form found, for example, on the control electrode 58 of the oscillator amplifier 44 if operated as a blocking oscillator. Due to the novel parasitic ringing provided by the present invention the wave form 114 is modified as shown at **114*b*** in Fig. 2*b* to show operation to be that of a well known squedging type oscillator as, for example, shown in the British patent to Watson Watt, et al., No. 235,254, dated June 11, 1925. It is seen that harmonic ringing at a frequency at least twice horizontal deflection rate causes a plurality of small peaks 116 to appear in the otherwise smooth blocking oscillator type wave form 114. These peaks may be considered as a synchronizing control signal or interlacing control signal and appears as a specific form of squedging oscillator action.

It will be assumed that the level "*o*" indicated in Figs. 2*a* and 2*b* is the firing threshold of the oscillator, that is any voltage above this level will cause the otherwise non-conductive amplifier 44 to become a conductive and produce the regenerative recycling pulse 120.

In the condition of 2*a*, where the parasitic ringing is absent, it will be evident that the point at which the amplifier 44 begins its regenerative cycle may be easily influenced by noise or other irregularities that might be imposed upon the wave form 114. In the prior art, such irregularities were commonly caused by the straight and virtually unpreventable electrostatic and electromagnetic coupling from the high voltage horizontal deflection circuit of horizontal frequency disturbances. This of course, tended to cause the vertical deflection oscillator to missynchronize and hence tend to destroy interlace.

However, in accordance with the present invention, it will be seen that the peaks 116 although in practice amounting to only a few percent of the total oscillator wave form, will act to define the point at which the blocking oscillator recycles itself such as to coincide with the beginning of a full horizontal line or end of a half horizontal line. The arriving vertical synchronizing pulse will determine whether it shall be the beginning of a horizontal line or the end of a horizontal half line due to its timed relationship with respect to the arriving horizontal synchronizing pulses which control the horizontal deflection circuit. Thus, the vertical synchronizing pulse does not need to have as steep a wave front as previously required in the prior art blocking and squedging type oscillators.

The vertical deflection circuit is provided with considerable noise immunity in the practice of the present invention for the reason more clearly illustrated in Fig. 2*c*. Fig. 2*c* shows an enlarged section of the wave form in Fig. 2*b*, in the vicinity where the oscillator wave form 114 reaches the threshold at which regenerative recycling of the oscillator commences. It will be seen in Fig. 2*c* that just prior to the parasitic wave form peak 116′ which causes the recycling of the oscillator, there is a downward dip 116″ which by merit of its downward undulation tends to reduce the effect of any noise which might otherwise reach the threshold "*o*" and cause premature triggering of the oscillator cycle.

It will be appreciated that although in the embodiment of the present invention described, the vertical deflection oscillator transformer 52 is caused to be parasitically resonant at a frequency equal to at least twice the horizontal deflection rate, a synchronizing control signal equivalent to the parasitic undulations may be produced in a variety of ways.

For example, a simple tuned circuit connected at most any place in the horizontal deflection section of a television receiver and tuned to the second harmonic of the horizontal deflection rate may well be utilized to generate a second harmonic voltage.

The second harmonic voltage developed across such a circuit can easily be capacitively or otherwise coupled to a suitable point in the vertical oscillator circuit to produce the undulations 116.

However, certain economies may be realized in the manufacture of television receivers by taking advantage of the simplicity with which an oscillator transformer having a parasitic resonance in accordance with the present invention may be constructed. For example, in the prior art, it has been common practice to use rather costly laminated cores with many turns of wire in the construction of a vertical deflection oscillator transformer.

However, according to the present invention, the vertical deflection oscillator transformer 52 may comprise nothing more than a relatively small number of wire turns around a ferrite core or slug. For example, Fig. 3 in the drawings, illustrates one simple form that a vertical deflection oscillator transformer may take in accordance with the present invention. The oscillator transformer 52 of Fig. 3 comprises a fibre tube 121, having a conventional metal cap 122 placed thereon for purposes of mounting the tube 121 in an opening 124 of a metal plate or sheet 126. This form of mounting fibre tubing is well known in the art. The ears **128*a* and 128*b* form engaging members for the screw thread 130 of the member 132. A ferrite slug 134 made of ferrite or other magnetic material is then fastened by some means to the right hand extremity of the member 132. The slug 134 is constructed to slide within the tube 121. With such an arrangement a primary and secondary winding comprising a relatively few number of wire turns may be placed on the outside of the fibre tube 121. There is shown in the drawing a secondary winding 136 wound on the immediate outer surface of the tube 121 while primary winding 138** is interleaved with the individual turns of the secondary winding.

In the practice of the present invention it has been found that a primary winding of approximately 1600 turns of 36 enamel wire and a secondary winding of 350 turns of 36 enamel wire works quite well.

The ends of the windings may conveniently be trimmed at suitable terminals fastened to the insulating rings of 140 and 142.

Figure 3:
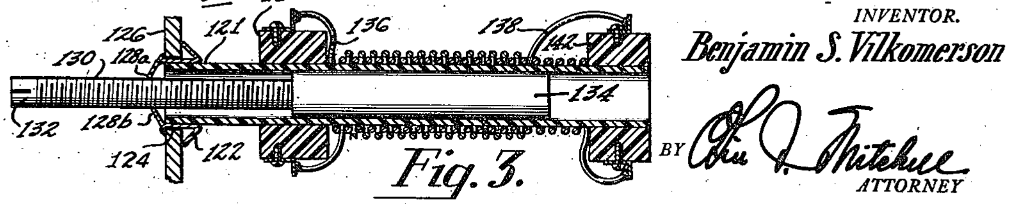
Fig. 3 illustrates one form the blocking oscillator transformer may take.

By interleaving the windings as shown in Fig. 3, the oscillator transformer of the present invention may be made to exhibit a relatively high distributed capacity in the secondary winding. This permits a relatively small inductance to be resonated at a frequency corresponding to an even multiple of the second harmonic of the horizontal deflection circuit operating frequency.

Figures 2, 4:
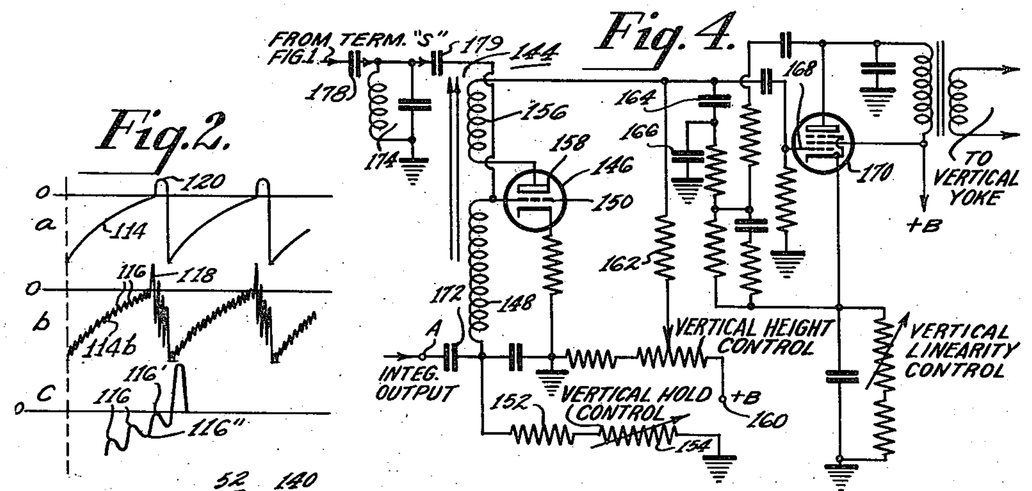
Fig. 2 is a graphic representation of certain electrical wave forms encountered in the operation of the present invention especially in the form shown in Fig. 1.
Fig. 4 illustrates by circuit diagram another form of the present invention.

Fig. 4 of the drawings illustrates another form of the present invention. Here the vertical deflection oscillator transformer 144 is connected somewhat differently to the amplifier tube 146 than shown for oscillator 52 of Fig. 1. The secondary 148 of the oscillator transformer 144 is connected between the control electrode 150 of amplifier 146 and a datum or ground potential through resistors 152 and 154. The primary 156 of the oscillator transformer 144 is connected between the anode 158 and a source of positive potential having a terminal for example, at 160. This latter connection is accomplished through the charging resistor 162 which in turn acts in conjunction with capacitors 164 and 166 to develop a sawtooth wave form at the control electrode 168 of output tube 170. This latter action has been described with respect to Fig. 1 and need not bear repeating.

The vertical synchronizing signal is applied to the lower extremity of the oscillator secondary winding 148 via capacitor 172. The left hand extremity of capacitor 172 is designated for connection with the output of the vertical integrating circuit as indicated by terminal "A," Fig. 1. The ringing or synchronizing control signal appearing across the secondary 148 has an effect identical to that described in connection with the description of Fig. 1.

The embodiment of Fig. 4, however, aside from the variance in the connection of the primary of the oscillator transformer 144 also includes a tuned circuit 174. The tuned circuit 174 is resonated at the second harmonic, or any integral multiple thereof, of the horizontal deflection frequency. Instead of relying entirely upon stray capacity to excite the secondary 148 of the oscillator transformer 144, the tuned circuit 174 may be directly coupled by a capacitor 178 with the output of the synchronizing signal separator 22. This is indicated at terminal "S" in Fig. 1. The ringing voltage appearing across resonant circuit 174 is coupled via capacitor 179 to the control electrode 150 of the oscillator tube 146. In this way the synchronizing control signal can be made to be synchronous and in phase with the equalizing pulses of the RMA vertical synchronizing signal, instead of with the horizontal deflection circuit located in the television receiver.

The extreme sensitivity of the synchronizing action obtained in the present invention and the relatively high noise immunity inherent in the scheme is illustrated by the provision of switch 180 in Fig. 1. Switch 180 effectively bypasses a portion of the integrating network thereby reducing integration of the vertical synchronizing signal as received from the television transmitter.

In accordance with the present invention it has been specifically found that when switch 180 is closed, the operation of the vertical oscillator is in no way affected, other than to sometimes cause the synchronization of the oscillator to coincide with the equalizing pulses of the vertical synchronizing signal rather than the operation of the horizontal deflection circuit.

Furthermore, the practice of the present invention provides another desirable stabilizing feature. It is well known that in any deflection oscillator or sawtooth discharge system used to produce a deflection sawtooth wave form, the capacitors acting as the sawtooth generating means must be discharged to the same point at the end of each deflection cycle in order to provide a vertical alignment of all horizontal lines and hence insure proper interlace. In the practice of the present invention it has been found that due to the parasitic burst 113 (Fig. 2*b*) occurring during retrace, sawtooth capacitors 76 and 78 in Fig. 1 are more uniformly discharged. It is believed that this more uniform discharge is realized due to the cyclic nature of the discharge which is dependent upon the free ringing of the rather high "Q" resonant circuit, which in Fig. 1 comprises the secondary 56 of the deflection oscillator transformer with its associated stray capacity. The use of such a burst is thought to be preferred to the single pulse 120, shown in Fig. 2*a*, sometimes relied upon in the prior art to define the discharge interval of the sawtooth capacitors. The ability of the single pulse 120 to discharge the sawtooth capacitors a discrete amount each cycle is manifestly dependent upon a minimum of power supply voltage variations and spurious signal influence.

It can, therefore, be seen that the present invention takes advantage of the normal and virtually unavoidable electrostatic and electromagnetic coupling existing between horizontal and vertical deflection circuits in television receiving systems and through the use of a novel double horizontal frequency injection arrangements employs this stray capacity to produce a synchronizing control signal which enhances the synchronizing accuracy of the vertical oscillator.

It can further be seen that the novel "double frequency" stabilizing action of the present invention can be applied to numerous types of deflection circuits not necessarily embodying a deflection oscillator circuit, per se.

What is claimed is:

1. In a television receiver having a horizontal and vertical deflection circuit each designated to operate at frequencies fractionally related to one another so as to produce line interlaced television images, said vertical deflection circuit being of the squedging oscillator variety the combination of a synchronizing signal input terminal means which is designated to be supplied with vertical synchronizing signal information, means coupled with said horizontal deflection circuit for producing a control wave form harmonically related to the horizontal deflection circuit operating frequency, means for superimposing said control wave form upon the vertical synchronizing information applied to said synchronizing signal input terminal means to produce a composite synchronizing wave form, and means coupled with said synchronizing terminal and said vertical deflection circuit for controlling said vertical deflection circuit with said composite wave form.

2. In a television receiving system of the type employing a vertical deflection circuit designated for operation at a fractional sub-multiple of the horizontal deflection rate so as to produce line interlaced television images, the combination of a synchronizing signal terminal means to which there is to be supplied vertical synchronizing information along with at least a small percentage of horizontal synchronizing information, a vertical deflection circuit of the squedging oscillator type, synchronizing control terminal means connected with said vertical deflection circuit for receiving synchronizing control signals, means responsive to horizontal synchronizing information coupled with said synchronizing signal terminal means for developing a frequency corresponding to an even harmonic of the horizontal deflection frequency of the television system, combining means for combining the output of said even harmonic producing means with the signals appearing at said synchronizing signal terminal means to form a composite control signal, and means coupled with said last named means and said synchronizing control terminal means for controlling said vertical oscillator with said composite control signal.

3. Apparatus according to claim 2 wherein said vertical deflection circuit includes a blocking oscillator type transformer and wherein said even harmonic producing means includes a resonant circuit embracing at least one winding of said blocking oscillator transformer.

4. In an electrical oscillator system for use in a television receiver, the combination of, a synchronizing signal supply terminal means designated to supply a television synchronizing signal wave form having a high frequency horizontal rate component and a low frequency vertical rate component, said high frequency component being a non-integral multiple of said low frequency component, a first oscillator designated for operation at the high frequency horizontal synchronizing signal rate, means for controlling the frequency of said first oscillator with the high frequency component of synchronizing signal wave form, a second oscillator designated to operate at the low frequency vertical synchronizing signal rate, a synchronizing signal processing circuit connected with said signal supply terminal means and adapted to attenuate said high frequency component and pass said low frequency component, connections from the output of said signal processing circuit to said second oscillator for controlling the fresuency thereof at the low frequency synchronizing signal rate, a resonant circuit operatively included in said second oscillator circuit as an oscillator feedback means, said resonant circuit being tuned to a harmonic of said high frequency synchronizing component, means coupling said resonant circuit with said synchronizing signal supply terminal means for excitation thereby, whereby to produce a control signal in said resonant circuit in supplement of the output of said signal processing circuit.

5. In a television receiver of the type adapted to receive line interlaced television picture signals based upon a predetermined line scanning frequency and a fractionally related lower field scanning frequency, the combination of: a source of horizontal and vertical synchronizing signals; a horizontal deflection circuit designed for operation at the line scanning frequency of the television signal; a vertical deflection circuit of the oscillatory type designated for operation at the field scanning frequency of the television signal; means operatively coupling said synchronizing signal source to said horizontal deflection circuit to control the timing of said horizontal deflection circuit in accordance with said horizontal synchronizing signals; resonant means operatively coupled with said source of synchronizing signals for producing a control waveform, the frequency value of which is harmonically related to the horizontal synchronizing signal periodicity; means operatively including said last named means in said vertical deflection circuit for feeding back oscillatory energy therein; means operatively coupling said synchronizing signal source with said vertical deflection circuit for effectively combining said control waveform with said vertical synchronizing signal to produce a compound synchronizing signal for controlling said vertical deflection circuit.

6. In a television receiver of the type designated for reception and reproduction of line interlaced television picture signals based upon a predetermined line scanning frequency and a fractionally related lower field scanning frequency, the combination of: a horizontal deflection circuit operatively coupled with said scanning means for delivering thereto a horizontal deflection signal; a vertical deflection circuit including a synchronizable oscillator operatively coupled with said scanning means for delivering thereto a vertical deflection signal, said vertical deflection oscillator being responsive to applied synchronizing signals for timing the developed vertical deflection signal; a source of horizontal synchronizing pulses derived from received television signals; means coupling said source of horizontal synchronizing pulses to said horizontal deflection circuit in operative relation thereto for timing the developed horizontal deflection signal; a source of vertical synchronizing pulses derived from received television signals; means operatively coupling said source of vertical synchronizing pulses with said vertical deflection circuit oscillator; oscillatory feedback means operatively included in said vertical deflection circuit oscillator responsive to received horizontal synchronizing pulses for developing a control waveform, the frequency of which is harmonically related to the frequency of horizontal deflection signal developed by said horizontal deflection circuit when synchronized by said horizontal synchronizing pulses circuit for supplementing and modifying the synchronizing influence of said vertical synchronizing pulses by said control waveform to maintain a fractional relation between the synchronized operating frequencies of said vertical and horizontal deflection circuits whereby line interlace in television pictures produced by said television receiver is maintained.

7. In a television receiver for transducing line interlaced television signals including visible television images, said television receiver including a source of vertical synchronizing pulses derived from received television signals, a source of horizontal synchronizing pulses derived from received television signals, said horizontal and vertical synchronizing pulses being fractionally related in recurrence frequency, a horizontal deflection circuit operatively coupled with said horizontal synchronizing pulse source for synchronized operation in accordance with the frequency of horizontal synchronizing pulses and a vertical deflection circuit including a squedging oscillator, said squedging oscillator including an amplifier device having an input circuit and an output circuit, the combination of: transformer means having inductive windings coupling said input circuit to said output circuit in regenerative feedback relation; time constant mean operatively intercalated in and in charging relation to said input circuit and of a time constant value causing squedging blocking of said amplifier in response to each of a series of periodically recurring bursts of oscillations produced by said transformer feedback, the value of input circuit impedance and the value of said time constant circuit being so related as to time the occurrence of said bursts to substantially agree with the periodicity of said vertical synchronizing pulses; capacitive means connected in shunt with said transformer of a value related to the value of said transformer inductance to tune said transformer into resonance at a selected frequency harmonically related to the frequency of said horizontal synchronizing pulses to produce a tendency for ringing of said transformer at said selected frequency whereby to define the frequency of said oscillations comprising said bursts; means operatively applying said vertical synchronizing pulses to said amplifier device for timing of said squedging blocking in accordance with said vertical synchronizing pulses; and means operatively coupling periodically recurrent signal impulses of horizontal deflection frequency to said transformer to excite said transformer into ringing at said selected frequency with a timing defining the duration of said squedge bursts and establishing a fixed fractional relationship between the operating frequencies of said horizontal and vertical deflection circuits corresponding to the fractional relationship in the frequencies of said horizontal and vertical synchronizing pulses.

References Cited in the file of this patent

UNITED STATES PATENTS

| | | |
|---|---|---|
| 2,378,746 | Beers | June 19, 1945 |
| 2,497,413 | Lindley | Feb. 14, 1950 |
| 2,546,972 | Chatterjea | Apr. 3, 1951 |
| 2,570,775 | De Baun | Oct. 9, 1951 |
| 2,653,187 | Luck | Sept. 22, 1953 |
| 2,697,744 | Richman | Dec. 21, 1954 |